(12) United States Patent
Davies

(10) Patent No.: US 6,557,806 B2
(45) Date of Patent: May 6, 2003

(54) DECK MOUNTABLE PLANT STAND

(76) Inventor: Robert J. Davies, 15905 Snodgrass Rd., Wamego, KS (US) 66547-9328

( * ) Notice: Subject to any disclaimer, the term of this patent is extended or adjusted under 35 U.S.C. 154(b) by 0 days.

(21) Appl. No.: 09/832,052

(22) Filed: Apr. 10, 2001

(65) Prior Publication Data

US 2002/0145092 A1 Oct. 10, 2002

(51) Int. Cl.⁷ ................................................. A47G 7/02
(52) U.S. Cl. .................... 248/121; 47/39; 211/85.23; 248/231.41; 248/177.1
(58) Field of Search ........................ 47/39; 211/85.23; 248/121, 122.1, 177.1, 186.1, 228.3, 229.12, 229.22, 231.41, 228.5, 229.14, 229.24, 231.61, 226.11, 228.1, 229.1, 229.2, 126; D6/556, 403, 404, 405

(56) References Cited

U.S. PATENT DOCUMENTS

| | | | | |
|---|---|---|---|---|
| 225,345 A | | 3/1880 | Clark ....................... 248/227.4 |
| 492,919 A | * | 3/1893 | Gridley ....................... 248/310 |
| 669,378 A | | 3/1901 | Baldwin ....................... 248/463 |
| 699,154 A | * | 5/1902 | De Force ....................... 108/92 |
| 753,042 A | * | 2/1904 | Chigor ....................... 126/230 |
| 1,045,123 A | | 11/1912 | Clisby ....................... 248/117.7 |
| 1,786,995 A | * | 12/1930 | Halberstadter ......... 248/221.11 |
| 2,313,115 A | * | 3/1943 | Allen et al. .................. 248/154 |
| 2,522,255 A | | 9/1950 | Climo ....................... 43/21.2 |
| 2,679,996 A | * | 6/1954 | Rowe et al. ................. 248/149 |
| D188,384 S | * | 7/1960 | Messer ....................... D11/147 |
| 3,332,654 A | * | 7/1967 | Jacobsen ..................... 211/107 |
| 3,469,810 A | * | 9/1969 | Dorris ......................... 24/525 |
| D215,857 S | * | 11/1969 | Olson ........................ D6/418 |
| 3,888,354 A | * | 6/1975 | Margolin et al. ........... 211/110 |
| 4,991,344 A | * | 2/1991 | Carney ..................... 211/133.2 |
| 5,240,214 A | | 8/1993 | Bimbaum et al. ..... 248/231.41 |
| 5,287,844 A | * | 2/1994 | Fieber ......................... 126/30 |
| D345,871 S | * | 4/1994 | Anderson ..................... D6/405 |
| 5,598,662 A | * | 2/1997 | Droste ........................ 47/39 |
| 5,675,931 A | * | 10/1997 | Wasserman ................. 211/78 |
| 5,775,654 A | * | 7/1998 | Price ......................... 248/103 |
| D446,402 S | * | 8/2001 | Davies ....................... D6/403 |
| D446,403 S | * | 8/2001 | Davies ....................... D6/403 |

* cited by examiner

Primary Examiner—Ramon O Ramirez
Assistant Examiner—Jon Szumny
(74) Attorney, Agent, or Firm—Shook, Hardy & Bacon L.L.P.

(57) ABSTRACT

A plant stand designed to be mounted on a railing of a structure, such as a deck, is provided. The plant stand includes a generally vertical frame having a proximal end connected to a base plate. A clamp connected to the base plate is designed to selectively clamp a railing of the structure between a body of the clamp and the base plate. A plurality of plant supports are coupled with the frame for supporting plants thereon. In first and second embodiments of the plant stand, the plant supports are spaced apart from and coupled with the frame via support arms. In the second embodiment, the support arms are adjustable by way of a plurality of brackets secured to legs of the frame.

9 Claims, 3 Drawing Sheets

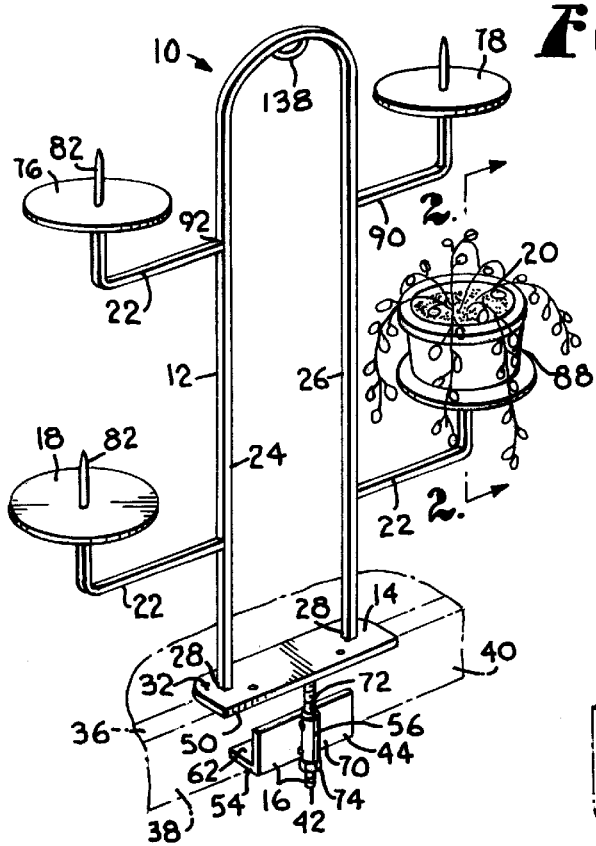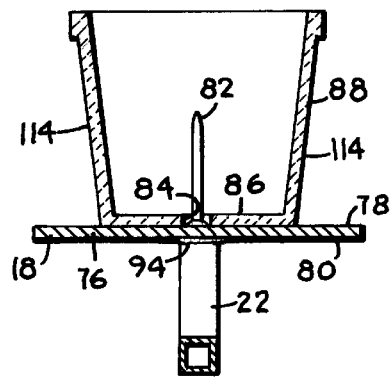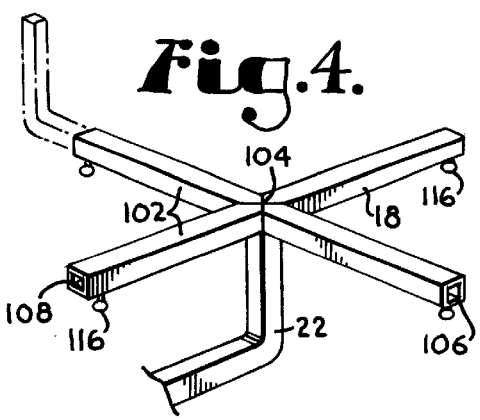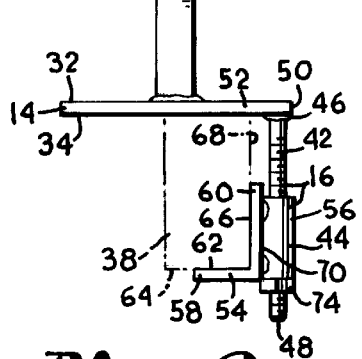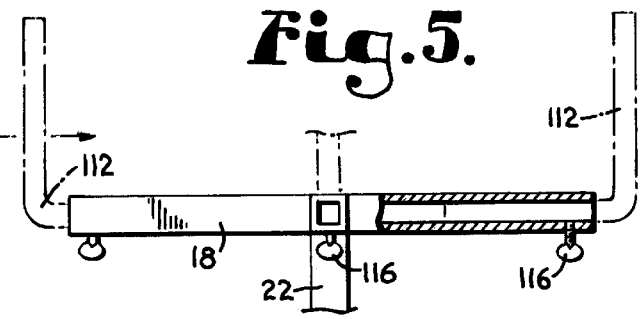

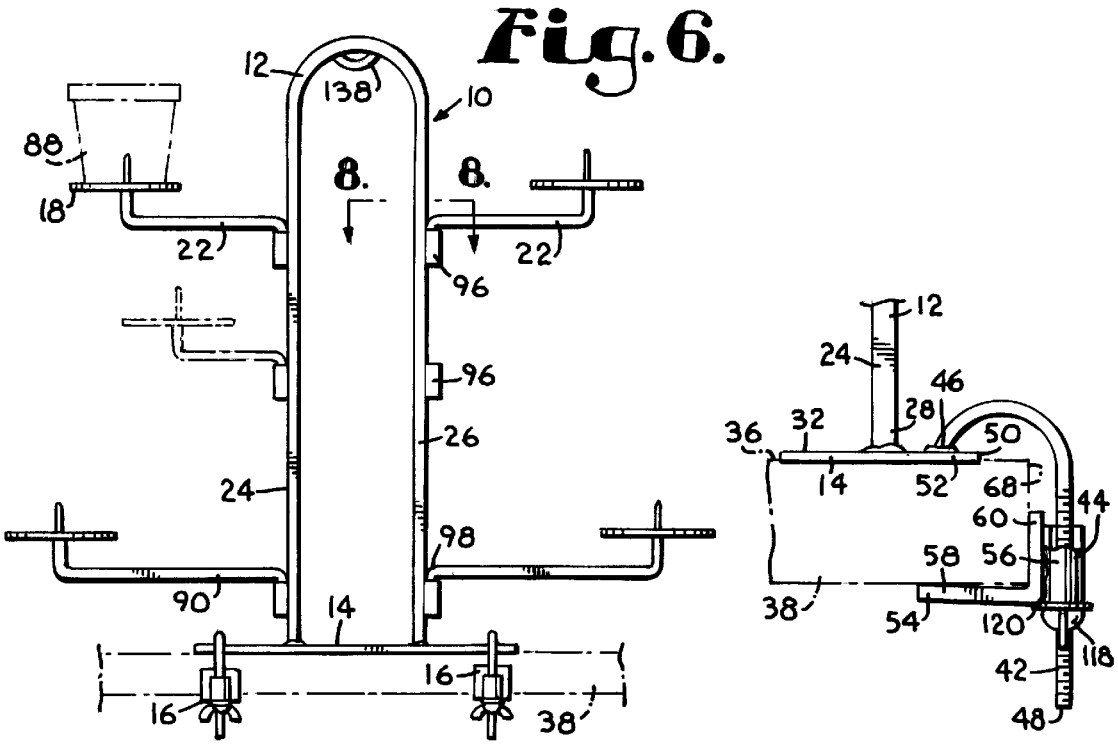
Fig. 6.
Fig. 7.
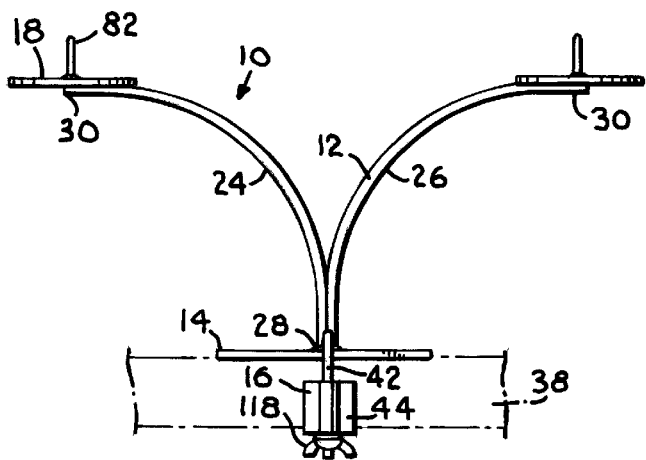
Fig. 9.
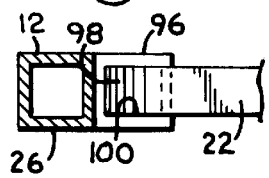
Fig. 8.

DECK MOUNTABLE PLANT STAND

CROSS-REFERENCE TO RELATED APPLICATIONS

The present application claims priority from U.S. application Ser. No. 29/126,615, now U.S. Pat. No. D446,403, entitled "Plant Stand", filed Jul. 18, 2000 and from U.S. application Ser. No. 29/126,614, now U.S. Pat. No. D446, 402, entitled "Plant Stand", filed Jul. 18, 2000.

STATEMENT REGARDING FEDERALLY SPONSORED RESEARCH OR DEVELOPMENT

Not applicable.

BACKGROUND OF THE INVENTION

The present invention relates to a stand for holding plants. More particularly, this invention relates to a plant stand designed to be mounted to a horizontal railing of a structure, such as a deck to permit a user to support plants thereon in an aesthetically pleasing arrangement and to provide a natural privacy wall.

Numerous types of devices exist for supporting and displaying potted plants. Most of the plant stands of the prior art, however, are designed only to serve the function of providing an aesthetically pleasing arrangement of the plant supports.

In today's increasingly populated society, more and more people are living in close proximity to one another while the desire for privacy increases. For example, large numbers of people live in apartment buildings with decks directly adjacent one another. For aesthetic reasons, many people place potted plants directly on the railings of the deck. However, there is a need for a way to arrange plants on a deck in a vertical orientation such that the foliage of the plants provide a natural privacy screen between the user and their neighbors.

Other problems of the plant stands of the prior art include the absence of a method of securing the containers of the plants to the plant stand such that they are not accidentally knocked off the decks by a person or the weather.

Therefore, there is a need for a plant stand which can be securely attached to a railing of a deck and securely support plants in a vertical arrangement there above. The present invention fills these and other needs.

BRIEF SUMMARY OF THE INVENTION

In order to overcome the above-stated problems and limitations, and to achieve the noted objects, there is provided a deck mountable plant stand with various ways to secure the container of the plant to the plant stand.

In general, the plant stand includes a generally vertical frame having a proximal end which is coupled to a base plate. A clamp is coupled with the base plate and designed to clamp a portion of a railing of a deck between the base plate and the clamp. A plurality of plant supports are coupled with the frame in various locations.

In first and second embodiments of the plant stand, the plant supports are coupled with the frame via support arms. The support arms space the plant supports away from legs of the frame. In the second embodiment, the support arms are removably coupled with brackets on the frame such that the user may selectively position and arrange the location of the plant supports on the plant stand.

A first method of securing the containers of plants to the plant stand includes a generally vertical prong generally centrally located on an upper surface of a plate of the plant support and extending upwardly therefrom. The prong is sized to be received in an aperture in the base of the container. The prong in turn sticks up into the soil in the plant and prevents the container from sliding off the plant support.

A second method of securing the container of a plant to the plant stand includes a plurality of L-shaped brackets partially and slidably received in horizontal openings in the plant support. The L-shaped brackets can be moved toward and away from each other to clamp containers of varying sizes. Once in the desired clamping orientation, the L-shaped brackets can be mechanically secured in placed via thumb screws.

In a third embodiment of a plant stand of the present invention, the plant supports are positioned directly on the frame to provide an aesthetically pleasing arrangement.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWING

The objects and features of the invention noted above are explained in more detail with reference to the drawing, in which like reference numerals denote like elements, and in which:

FIG. 1 is a rear perspective view of a first embodiment of a plant stand of the present invention;

FIG. 2 is a cross-sectional view of a plant support of the plant stand taken generally along the line 2—2 in FIG. 1;

FIG. 3 is a fragmentary side elevational view of a base plate and clamp of the plant stand of FIG. 1;

FIG. 4 is a fragmentary perspective view of an alternate embodiment of a plant support for a plant stand of the present invention;

FIG. 5 is a side elevational view of the alternate embodiment of the plant support of FIG. 4 with a portion thereof cut-away for clarity;

FIG. 6 is a rear elevational view of a second embodiment of a plant stand of the present invention;

FIG. 7 is a fragmentary side elevational view of a base plate and clamp of the plant stand of FIG. 6;

FIG. 8 is a fragmentary top plan view taken generally along the line 8—8 in FIG. 6 and illustrating the removable connection between a support arm and a bracket;

FIG. 9 is a rear elevational view of a third embodiment of a plant stand of the present invention;

DETAILED DESCRIPTION OF THE INVENTION

Figure 10:
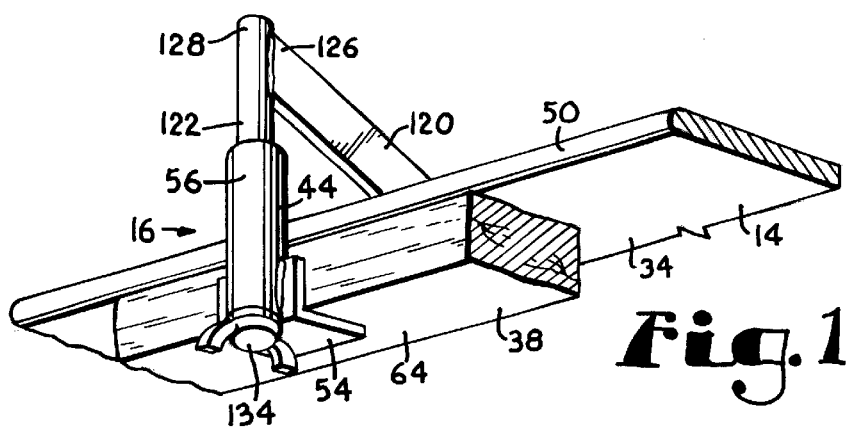
FIG. 10 is a rear perspective view of a third embodiment of a clamp for securing the base of a plant stand of the present invention to a railing.

Referring now to the drawing in detail, and initially to FIG. 1, numeral 10 generally designates a deck mountable plant stand of the present invention. The stand 10 has a frame 12, a base plate 14 connected thereto, a clamp 16 connected to the base plate 14, and a plant support 18 coupled with the frame for supporting a plant 20 thereon. In a first embodiment of the present invention, as illustrated in FIG. 1, the stand 10 also includes a support arm 22.

The frame 12 is preferably an inverted U-shaped member having a first leg 24 and a second leg 26. The frame 12 has a generally vertical longitudinal axis, which is generally parallel to the legs 24, 26, and a proximal end 28 and a distal end 30.

The frame 12 is preferably constructed of solid bar stock having a square cross-section. It is, of course, within the scope of the present invention to fabricate the frame 12 out of wood or another suitable rigid material, or to have a non-square cross-section (such as circular, triangular, etc.) or to use hollow tubing stock. The bar stock for the frame 12 is preferably bent to the desired shape in accordance with known procedures whereby the distal end 30 is at an apex of the frame 12 and the proximal end 28 of the frame 12 is at the lower ends of the legs 24, 26 and is connected to the base plate 14.

The base plate 14 is preferably also constructed of metal and is preferably a generally flat metal plate. The base plate 14 has an upper surface 32 and a lower surface 34. The proximal end 28 of the frame 12 is connected to the upper surface 32 of the base plate 14, preferably by welding. The lower surface 34 of the base plate 14 is designed to abut and rest on an upper surface 36 of a horizontal railing 38 of a deck when in use.

A first embodiment of the clamp 16, as illustrated in FIGS. 1 and 3, preferably includes a rod 42 and a carriage 44. The rod is preferably threaded and has a proximal end 46 and a distal end 48. The proximal end 46, in the first embodiment, is preferably connected to the lower surface 34 of the base plate 14 adjacent a rear edge 50. A rear portion 52 of the base plate 14 overhangs the railing 38 such that the rod 42 depends downwardly from the lower surface 34.

The carriage 44 includes a body 54 and a sleeve 56. The body 54 is preferably an L-shaped member having a horizontal portion 58 and a vertical portion 60. The body 54 may be fabricated from two separate pieces or, alternatively, may simply be a short piece of angle iron. The horizontal portion 58 has an upper surface 62 which is designed to abut a lower surface 64 of the railing 38. The vertical portion 60 of the body 54 has an inner surface 66, designed to abut a side 68 of the railing 38, and an outer surface 70. The sleeve 56 is connected to the outer surface 70 of the vertical portion 60 of the body 54 and includes a longitudinal bore 72 therethrough. The rod 42 is received in the bore 72 of the sleeve 56 and the carriage 44 is slidable thereon toward and away from the base plate 14. A nut 74 is threadably received on the rod 42, whereby tightening of the nut 74 moves the carriage 44 toward the base plate 14 and thereby clamps the railing 38 between the base plate 14 and the horizontal portion 58 of the body 54 of the carriage 44.

A first embodiment of the plant support 18 is illustrated in FIGS. 1, 2, 6 and 9. The plant support 18 is preferably a flat metal plate and, for aesthetic and safety reasons, is preferably circular in nature. The plate 76 has an upper surface 78 and a lower surface 80. In order to make sure that a plant 20 positioned on the plant support 18 stays thereon until a user desires the plant to be removed, the first embodiment of the plant support 18 also includes a generally vertical prong 82 extending upwardly from the upper surface 78 of the plate 76. The prong 82 is designed to be received in an aperture 84 in a base 86 of a container 88 of the plant 20.

In the first and a second embodiment of the plant stand 10 disclosed herein, and as illustrated in FIGS. 1–8, the plant supports 18 are coupled with the frame 12 by support arms 22. The support arm 22 is preferably made of the same material as the frame 12. In the first embodiment, the support arm 22 is generally L-shaped having an extension section 90 and proximal and distal ends 92, 94. In the first embodiment, the proximal ends 92 of the plant supports 18 are preferably welded to the frame 12. The distal ends 94 are in turn welded to the lower surfaces 80 of the plant supports 18.

In the second embodiment, and as pictured in FIGS. 6 and 8, the support arms 22 are generally Z-shaped and are removably coupled with the frame 12 via a bracket 96. In this embodiment, the support arm 22 has a downwardly turned proximal portion 98 which is received in a vertical opening 100 in the bracket 96. It has been found beneficial to provide the bracket 96 with the opening 100 therein by using a short piece of tubing welded to one of the legs 24, 26 of the frame 12. Additionally, in order to prevent the support arms from swinging back and forth and pivoting in the opening 100, it has been found beneficial to provide the opening 100 and the mating proximal portion 98 with non-round cross-sections, such as the square cross-sections illustrated. By providing a plurality of brackets 96 spaced vertically along the legs 24, 26, a user may selectively adjust the orientation, arrangement and height of the plant supports and the distances therebetween to accommodate a wide variety of different sized and shaped plants 20.

FIGS. 4 and 5 illustrate a second embodiment of the plant support 18. In this embodiment, instead of providing the plant support as a flat metal plate, the plant support is provided by a plurality of support members 102 extending radially outwardly from a central location 104. The support members 102 have distal ends 106 with horizontal openings 108 therein. A horizontal portion 110 of an L-shaped bracket 112 is then slidably received in the opening 108 of the support member 102. Opposing L-shaped brackets 112 may then be moved towards each other until they abut and clamp sides 114 of the container 88. Once the brackets are in the proper location up against the sides 114 of the container 88, the L-shaped brackets 112 are maintained in place by way of thumb screws 116 provided in the support members 102 which cooperate with the horizontal portion 110 of the L-shaped bracket 112.

FIGS. 6 and 7 illustrate a second embodiment of the clamp 16. In this embodiment, the clamp includes two downwardly depending rods 42 with each receiving its own carriage 44. In this embodiment, the rear portion 52 of the base plate 14 does not overhang the railing 38. Instead, and as best illustrated in FIG. 7, the rear edge 50 of the base plate is spaced back from the side 68 of the railing 38. In order to provide this arrangement, the rods 42 are J-shaped with the proximal ends 46 connected to the upper surface 32 of the base plate adjacent opposite ends thereof. In this embodiment, the nut 74 has been replaced with wing nuts 118 and a washer 120. Additionally, the horizontal portion 58 has been bent upwardly to provide for an acute angle between the horizontal portion 58 and vertical portion 60. This slight upward bend of horizontal portion 58 has been found to provide beneficial clamping pressure.

FIG. 9 illustrates a third embodiment of the plant stand 10 of the present invention. In this embodiment, the frame 12 again has first and second legs 24, 26 and a proximal end 28. However, in this embodiment, the frame 12 is generally V-shaped and the plant supports 18 are mounted directly on the frame 12.

Figure 11:
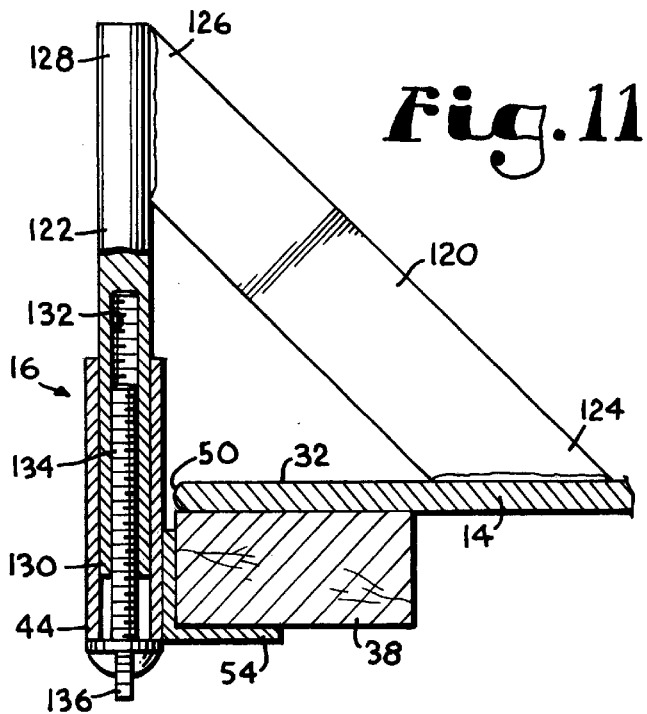
FIG. 11 is a cross-sectional view of the clamp of FIG. 10 clamping a thin railing.
Figure 12:
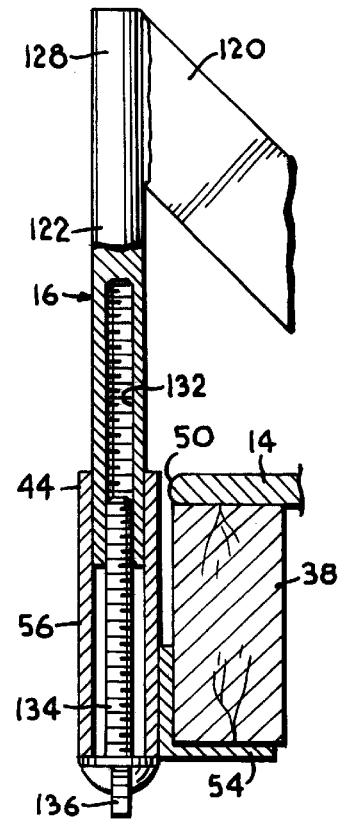
FIG. 12 is a cross-sectional view of the clamp of FIG. 10 clamping a thick railing.

FIGS. 10, 11 and 12 illustrate a third embodiment of the clamp 16. In this embodiment, the J-shaped rod 42 of the second embodiment has been replaced by an angled support 120 and shaft 122. The angled support 120 has a proximal end 124 which is secured to the upper surface 32 of the base plate 14 and a distal end 126 which extends rearwardly beyond the rear edge 50 of the base plate 14. The distal end 126 is connected to the shaft 122 such that the angled support 120 holds and maintains the shaft 122 in a generally vertical orientation.

The shaft 122 has a proximal end 128, which is connected to the distal end 126 of the angled support 120, and a distal end 130. The distal end 130 contains a bore 132 therein which is internally threaded.

As with the other embodiments, the clamp also includes a carriage 44 having a body 54 in a sleeve 56. The sleeve 56 has an inner diameter slightly greater than an outer diameter of the shaft 122 such that the sleeve is slidingly and telescopingly received on the shaft 122. A bolt 134 with a wing nut head 136 couples the sleeve 56 with the shaft 122 and is threadably received in the bore 132. This arrangement, while still providing the desired adjustability of the first and second embodiment, does so in a safer manner as it does not have the distal end 48 of the rod 42 protruding outwardly from the clamp 16.

Multiple combinations and mixing and matching of the various embodiments are well within the scope of the present invention. Other modifications which are within the scope of the present invention include the positioning of a plant hanger bar 138 intermediate the legs 24, 26 of the frame 12 and positioned adjacent a distal end 30. The plant hanger bar 138 permits a user of the plant stand 10 to hang a plant 20 intermediate the first and second legs 24,26. Another modification contemplated would be the inclusion of a third plant support 18 to the third embodiment illustrated in FIG. 9. The third plant support 18 would be placed in the V of the frame 12 with the outer periphery of the plate 76 of the plant support 18 being supported by the legs 24, 26 (not illustrated).

From the foregoing it will be seen that this invention is one well adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A plant stand for mounting on a deck, the stand comprising:
   a frame having a proximal end, wherein the frame is generally V-shaped and has first and second legs with distal ends;
   a base plate connected to the proximal end of the frame for supporting the frame thereon;
   a clamp connected to the base plate for securing the stand to the deck; and
   a plant support coupled with the frame for supporting a plant thereon, wherein the plant support is coupled with the frame at the distal end of one of the legs, wherein the wherein the plant support includes a generally horizontal upper surface for supporting a container of the plant, and wherein the plant support further includes a generally vertical prong extending upwardly from the upper surface for receipt in a bore in a bottom of the container of the plant.

2. The stand of claim 1, further comprising a second plant support, wherein the second plant support is coupled with the frame at the distal end of the other of the legs, whereby the first and second legs each have a plant support coupled therewith at their distal ends.

3. A plant stand for mounting on a deck, the stand comprising:
   a frame having a proximal end, wherein the frame is generally upside down U-shaped and has first and second legs, and wherein the frame includes a plant hanger bar intermediate the first and second legs for hanging a plant there between;
   a base plate connected to the proximal end of the frame for supporting the frame thereon;
   a clamp connected to the base plate for securing the stand to the deck; and
   a plant support coupled with the frame for supporting a plant thereon.

4. The plant stand of claim 3, wherein the stand includes a plurality of plant supports and wherein the plant supports are coupled with the legs of the frame via support arms.

5. A plant stand for mounting on a deck having a general horizontal rail with upper and lower surfaces, the stand comprising:
   a frame having a proximal end;
   a base plate connected to the proximal end of the frame for supporting the frame thereon, wherein the base plate has upper and lower surfaces, wherein the proximal end of the frame is connected to the upper surface of the base plate, and wherein the lower surface of the base plate abuts the upper surface of the rail of the deck when the stand is mounted on the deck;
   a clamp connected to the base plate for securing the stand to the deck, wherein the clamp includes a rod and a carriage, wherein the rod has a proximal end and a distal end, wherein the proximal end of the rod is connected to the upper surface of the base plate, wherein the distal end of the rod is threaded, wherein the carriage is slidably received on the rod and wherein the carriage is selectively movable toward the base plate to permit clamping of the rail of the deck; and
   a plant support coupled with the frame for supporting a plant thereon.

6. The stand of claim 5, wherein the carriage includes a body and a sleeve, wherein the body is generally L-shaped with a vertical piece and a horizontal piece, wherein the horizontal piece engages the lower surface of the rail, wherein the sleeve is coupled with the vertical piece and wherein the rod passes through the sleeve.

7. The stand of claim 5, wherein the rod is generally upside down J-shaped.

8. The stand of claim 5, wherein the clamp further includes a nut threadably received on the rod for drawing the carriage closer to the base plate.

9. The stand of claim 5, wherein the rod is generally upside down J-shaped and wherein the clamp further includes a nut threadably received on the rod for drawing the carriage closer to the base plate.

* * * * *